Figure 2:
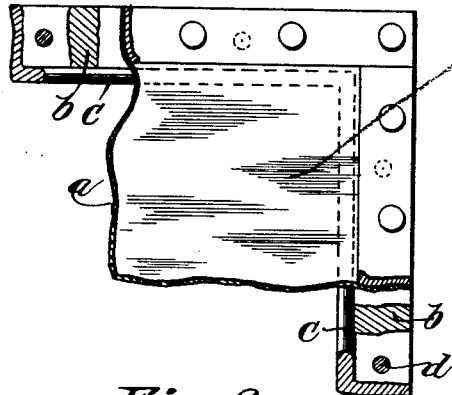
Figure 1:
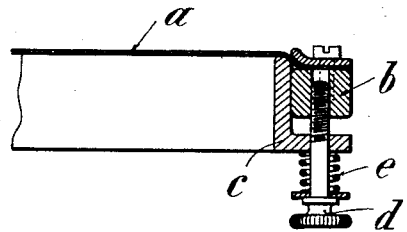

L. GEISLER.
TRANSPARENT REFLECTOR.
APPLICATION FILED MAY 12, 1910.

1,060,447.

Patented Apr. 29, 1913.

Attest:
Ed L. Tolson
Edward N. Sartor

Inventor:
Louis Geisler,
by Spear, Middleton, Donaldson & Spear
Attys.

UNITED STATES PATENT OFFICE.

LOUIS GEISLER, OF LES CHATELLES, NEAR RAON L'ÉTAPE, FRANCE, ASSIGNOR TO CHROMOGRAPHY LIMITED, OF LONDON, ENGLAND.

TRANSPARENT REFLECTOR.

1,060,447.  Specification of Letters Patent.  Patented Apr. 29, 1913.

Application filed May 12, 1910. Serial No. 560,980.

*To all whom it may concern:*

Be it known that I, LOUIS GEISLER, a citizen of the Republic of France, residing at Les Chatelles, near Raon l'Étape, Vosges, in the Republic of France, have invented certain new and useful Improvements in Transparent Reflectors, of which the following is a specification.

In certain industries such as photography for example mirrors are employed which have the property of reflecting the image of an object at a given angle and also of giving normally by transmission another similar image thereby rendering it possible to obtain a number of similar images of one and the same object which images after having been selected by appropriate color screens can be superposed so as to give a single image the tonality of which is the same as that of the object. This property of mirrors has been utilized in color photography in what is termed the three-color process but the mirrors heretofore employed have not given entirely satisfactory results owing to the fact that as they are of a certain thickness they double and deform each of the selected images. On the one hand the rays reflected simultaneously on both surfaces of the mirror give rise to the formation of two images which are in juxtaposition but do not register on the plate obtained by reflection, while on the other hand the rays refracted under different angles (as a result of the divergence of the incident rays) through the mirror likewise produce upon the plate obtained by transmission the formation of two images which are in juxtaposition but which do not register one with the other and which are likewise different from those obtained by reflection. These doubled images prevent absolutely correct registration of the monochrome plates when they are superposed and in any event utterly destroy the sharpness and fineness of the image as a whole. This impossibility of obtaining perfect registration which causes inconveniences when the photograph is reproduced by means of pigments becomes still more noticeable when the colors are selected by means of the chromoscope. A mirror in accordance with the present invention removes these defects by eliminating the effects of double reflection and refraction resulting from the mirrors heretofore employed, and permits of the perfect super-position of the selected images of a single object.

The device consists broadly in substituting for the thick sheet of silvered or colored glass heretofore employed as mirror, a sheet of exceedingly thin transparent material which may be of gelatin, celluloid or any other material fulfilling the same purpose. This sheet is rendered reflecting either during or after its manufacture by any known process.

The ratio between the rays reflected by the mirror and the rays traversing it may be regulated by the known means of pigment coloring, that is to say by means of any appropriate partially opaque covering, this coloration lessening the transparency of the mirror, not for avoiding the doubled images emanating from the complementary colors of the screens, but so as to regulate the distribution of the luminous rays in proportion to the sensibility of the plates. Such a mirror, the thickness of which is negligible, being employed for color photography in the three color process permits of obtaining monochrome plates which are perfectly adapted for super-position. In addition to this advantage this arrangement permits of dispensing with the use of the colored screen mirrors which have heretofore been considered indispensable for avoiding certain of the inconveniences referred to above so that it is possible to obtain selector mirrors which are rendered brilliant by any suitable process. In addition these thin mirrors present the property of not absorbing the luminous rays and of appreciably increasing the speed of the impression upon the plates, thus correspondingly reducing the time of exposure.

The thin sheet employed should be perfectly plane in order to prevent deviation of the reflected rays. For this purpose the arrangement here illustrated by way of example may be utilized. The thin sheet *a* is given a preliminary tension which is as perfect as possible, on a frame *b* to which it is suitably secured. This frame *b* fits exactly around a second frame *c* with which it is firmly connected by means of screws *d* between the heads of which and the frame *c*, springs *e* are interposed. These springs tend to press the frame c constantly against the peripheral part of the sheet a which is fixed to the frame b in such a manner that the entire surface of this sheet is suitably stretched whatever its hygrometric condition may be. This method of fixing likewise prevents any displacement of the plane of the reflector. Any other tensioning device for the sheet may, however, be employed for the same purpose.

What I claim and desire to secure by Letters Patent of the United States is:—

1. A mirror eliminating the deformations due to the phenomena of reflection and refraction upon plates with parallel faces comprising a sheet of negligible thickness of transparent colored material, suitably stretched and rendered reflecting by any convenient method, the ratio between the rays reflected by the mirror and the rays passing through it being determined.

2. A mirror eliminating the deformations due to the phenomena of reflection and refraction upon plates with parallel faces comprising a sheet of negligible thickness of transparent colored material, suitably stretched and rendered reflecting by any convenient method, the ratio between the rays reflected by the mirror and the rays passing through it being determined and the sheet being put under tension by securing the edges thereof.

In testimony whereof I affix my signature in presence of two witnesses.

LOUIS GEISLER.

Witnesses:
VICTOR DUPONT,
GEORGES BONNEVIE.